(12) United States Patent
White

(10) Patent No.: US 10,983,769 B2
(45) Date of Patent: Apr. 20, 2021

(54) SYSTEMS AND METHODS FOR USING A CALL CHAIN TO IDENTIFY DEPENDENCIES AMONG A PLURALITY OF MICROSERVICES

(71) Applicant: Citrix Systems, Inc., Fort Lauderdale, FL (US)

(72) Inventor: Jeremy White, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/414,628

(22) Filed: May 16, 2019

(65) Prior Publication Data

US 2020/0364035 A1    Nov. 19, 2020

(51) Int. Cl.
  *G06F 8/41*    (2018.01)
  *G06F 9/54*    (2006.01)

(52) U.S. Cl.
  CPC .............. *G06F 8/433* (2013.01); *G06F 9/547* (2013.01)

(58) Field of Classification Search
  None
  See application file for complete search history.

(56) References Cited

U.S. PATENT DOCUMENTS

| | | | |
|---|---|---|---|
| 2017/0046146 A1 | 2/2017 | Jamjoom et al. | |
| 2017/0242784 A1* | 8/2017 | Heorhiadi | G06F 11/3692 |
| 2018/0309802 A1* | 10/2018 | Sahu | H04L 61/106 |
| 2019/0004871 A1 | 1/2019 | Sukhomlinov et al. | |
| 2019/0068438 A1* | 2/2019 | Kumar | G06F 8/70 |
| 2019/0104184 A1* | 4/2019 | Gao | H04L 67/16 |
| 2019/0182309 A1* | 6/2019 | Koszek | H04L 67/02 |
| 2020/0067800 A1* | 2/2020 | Wang | H04L 41/5051 |
| 2020/0351392 A1* | 11/2020 | Bomma | H04L 69/40 |

OTHER PUBLICATIONS

International Search Report and Written Opinion on International Appl. No. PCT/US2020/032329 dated Jul. 15, 2020.

* cited by examiner

Primary Examiner — Charles E Anya
(74) Attorney, Agent, or Firm — Foley & Lardner LLP

(57) ABSTRACT

Described embodiments provide systems and methods for using a call chain to identify dependencies among a plurality of microservices. A device intermediary to a plurality of microservices can receive a first request to access a first microservice. The processing of the first request can cause the first microservice to communicate a second request to a second microservice. A first unique identifier can be generated for the first request to the first microservice and the device can establish a call chain for identifying a plurality of requests to a first microservice through a last microservice of the plurality of microservices accessed responsive to the first request. The device can forward the first request including the call chain to the first microservice and the second request including the call chain to the second microservice. The device can identify, via the call chain, that the first microservice depends on the second microservice.

20 Claims, 13 Drawing Sheets

SYSTEMS AND METHODS FOR USING A CALL CHAIN TO IDENTIFY DEPENDENCIES AMONG A PLURALITY OF MICROSERVICES

BACKGROUND

Devices can include or use a plurality of software applications to perform a variety of different functions. The applications can be built a single, autonomous unit such that the applications are self-contained and independent from other applications executing on a device. However, to update the applications, changes can impact the entire application or device executing the respective application. For example, a modification to a small section of code can require building and deploying an entirely new version of software for the application.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for using a call chain to identify dependencies among a plurality of microservices. A device can be disposed between a plurality of microservices to route and monitor calls and requests communicated between the different microservices to determine dependencies for the plurality of microservices. In embodiments, the device can monitor and record deep call graphs for east-west traffic or east-west microservice calls based in part on an initial or original request. For example, the device can receive an initial request. The initial request can be for a first microservice of a plurality of microservices that collectively can be a component a service or application. The first microservice can, responsive to the initial request, communicate a second request to a second microservice of the plurality of microservices. The device can generate a call chain based on the initial request that can identify a plurality of requests for the first microservice through a last microservice of the plurality of microservices to handle or complete the initial request. The initial request can be forwarded to the first microservice and include the call chain with the initial request.

The device can monitor and track subsequent calls or requests generated responsive to the initial request and made between the plurality of microservices. The call chain can be updated to include or identify the microservices communicated with subsequent to the first microservice. The device can use the call chain to identify one or more dependencies between the plurality of microservices. For example, the device can determine that a first microservice depends on a second microservice based in part on at least one communication or call made between the first microservice and the second microservice. In embodiments, the device can monitor the communications between the microservices to determine statistics such as, but not limited to, call counts, times, and/or success rates for incoming calls. The device can identify failures between different microservices to reduce time to resolution for inter-service failures.

In at least one aspect, a method for using a call chain to identify dependencies among a plurality of microservices is provided. The method can include receiving, by a device intermediary to a plurality of microservices, a first request to access a first microservice of the plurality of microservices. In embodiments, the processing of the first request by the first microservice can cause the first microservice to communicate at least a second request to a second microservice of the plurality of microservices. The method can include generating, by the device, a first unique identifier for the first request to the first microservice and establishing, by the device, a call chain for identifying a plurality of requests to a first microservice through a last microservice of the plurality of microservices accessed responsive to the first request. The call chain can identify the first unique identifier. The method can include forwarding, by the device, the first request including the call chain to the first microservice and including, by the device, in the call chain a second unique identifier generated by the device for the second request to the second microservice. The method can include forwarding, by the device, the second request including the call chain to the second microservice. The call chain can identify the first microservice and the second microservice. The method can include identifying, by the device via the call chain, that the first microservice depends on the second microservice.

In some embodiments, the processing of the second request can cause the second microservice to communicate a third request to a third microservice of the plurality of microservices. The method can include generating, by the device, a third unique identifier for the third request and having the third unique identifier be identified by the call chain. The method can include receiving, by the device, the second request to access the second microservice responsive to the first microservice processing the first request. The method can include generating, by the device, the second unique identifier responsive to receiving the second request.

In embodiments, a header of one of the first request or the second request can include the call chain. The call chain can include metadata attached to one of the first request or the second request. Each of the plurality of microservices can be a component of one or more services. The device can be one a proxy or a gateway. The method can include generating a service graph of the call chain to identify a failure between the plurality of microservices, a number of times a microservice has been called, a time at which the microservice has been called and a rate of success of using the plurality of microservices of the call chain.

In at least one aspect, a system for using a call chain to identify dependencies among a plurality of microservices is provided. The system can include a device comprising one or more processors, coupled to memory and intermediary to a plurality of microservices. The device can be configured to receive a first request to access a first microservice of the plurality of microservices. In embodiments, the processing of the first request by the first microservice can cause the first microservice to communicate at least a second request to a second microservice of the plurality of microservices. The device can be configured to generate a first unique identifier for the first request to the first microservice. The device can be configured to establish a call chain for identifying a plurality of requests to a first microservice through a last microservice of the plurality of microservices accessed responsive to the first request, wherein the call chain identifies the first unique identifier. The device can be configured to forward the first request including the call chain to the first microservice and include in the call chain a second unique identifier generated by the device for the second request to the second microservice. The device can be configured to forward the second request including the call chain to the second microservice. The call chain can identify the first microservice and the second microservice. The device can be configured to identify, via the call chain, that the first microservice depends on the second microservice.

In some embodiments, the processing of the second request can cause the second microservice to communicate a third request to a third microservice of the plurality of microservices. The device can be further configured to generate a third unique identifier for the third request and having the third unique identifier be identified by the call chain. The device can be further configured to receive the second request to access the second microservice responsive to the first microservice processing the first request. In embodiments, the device can be further configured to generate the second unique identifier responsive to receiving the second request.

In some embodiments, a header of one of the first request or the second request can include the call chain. The call chain can include metadata attached to one of the first request or the second request. Each of the plurality of microservices can be a component of one or more services. The device can be further configured to generate a service graph to identify a failure between the plurality of microservices, a number of times a microservice has been called, a time at which the microservice has been called and a rate of success of using the plurality of microservices of the call chain.

In at least one aspect, a system is provided. The system can include a device comprising one or more processors, coupled to memory and intermediary to a plurality of microservices. The device can be configured to track a plurality of requests between the plurality of microservices using a plurality of call chains. Each of the plurality of call chains can identify via one or more unique identifiers a plurality of requests from a first microservice through a last microservice of the plurality of microservices. The device can be configured to generate, based at least on the plurality of call chains, one or more service graphs identifying one or more dependencies between two or more microservices. The device can be configured to identify via the one or more service graphs a failure between the two or microservices that have a dependency.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
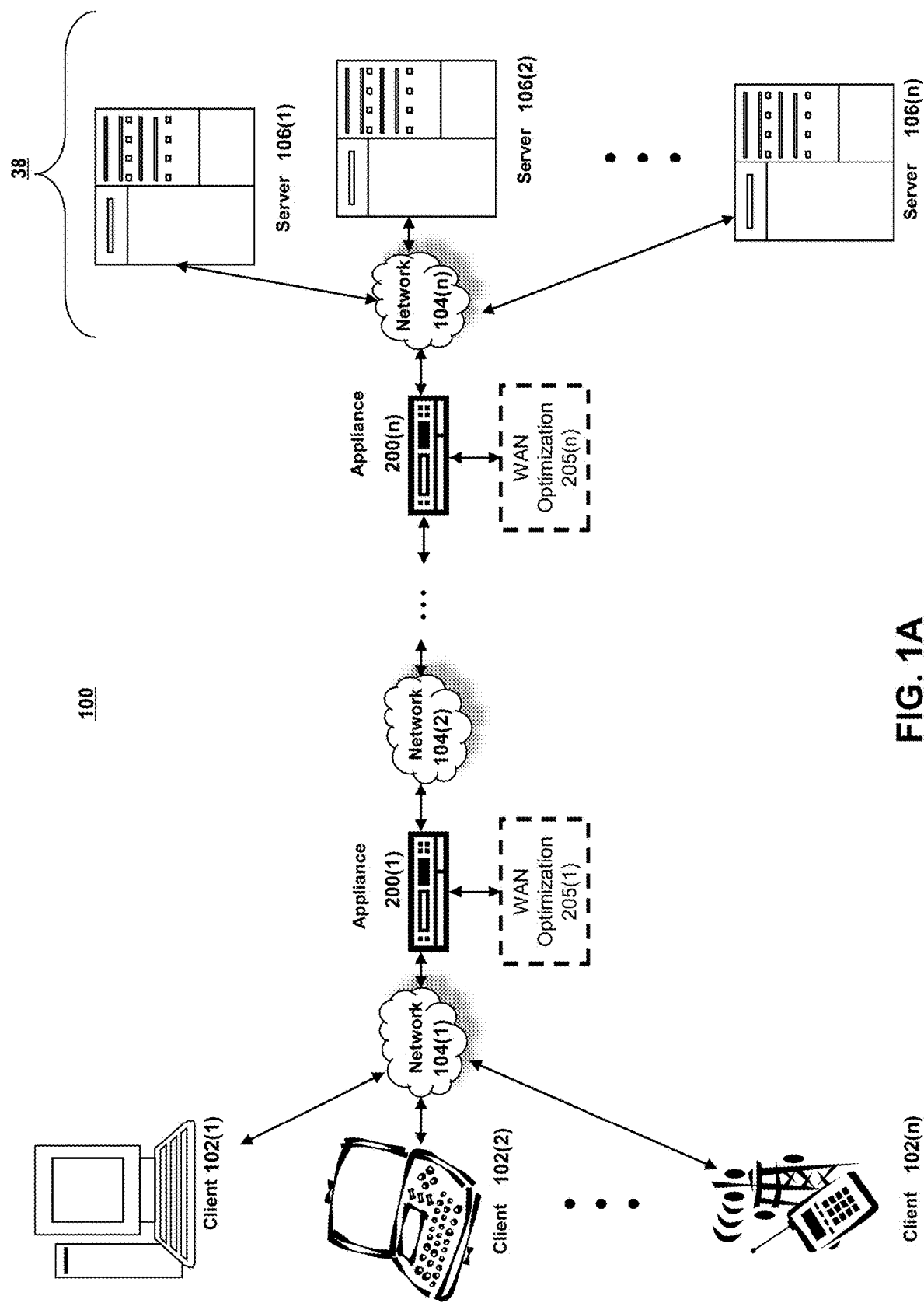
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes implementation of systems and methods for a service graph based platform and technology; and Section F describes embodiments of systems and methods for using a call chain to identify dependencies among a plurality of microservices.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
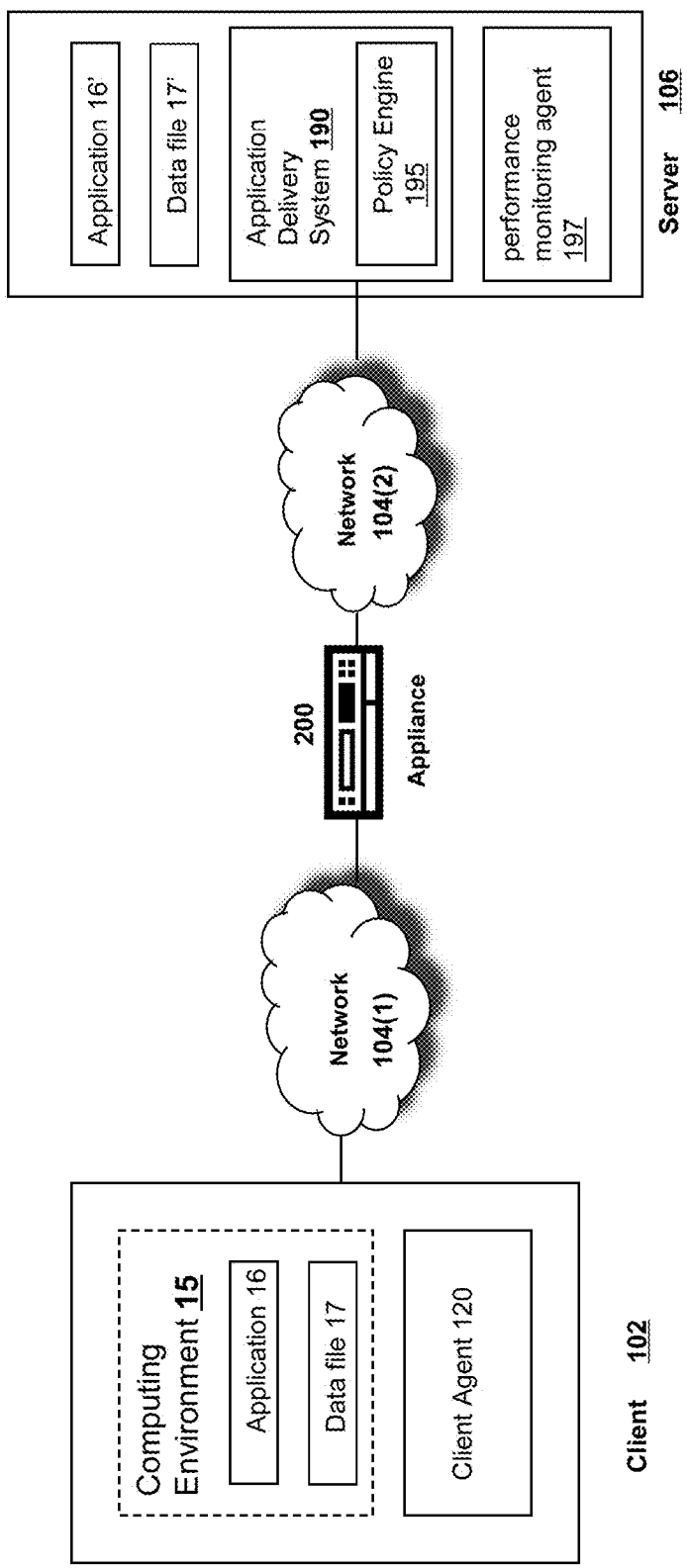
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
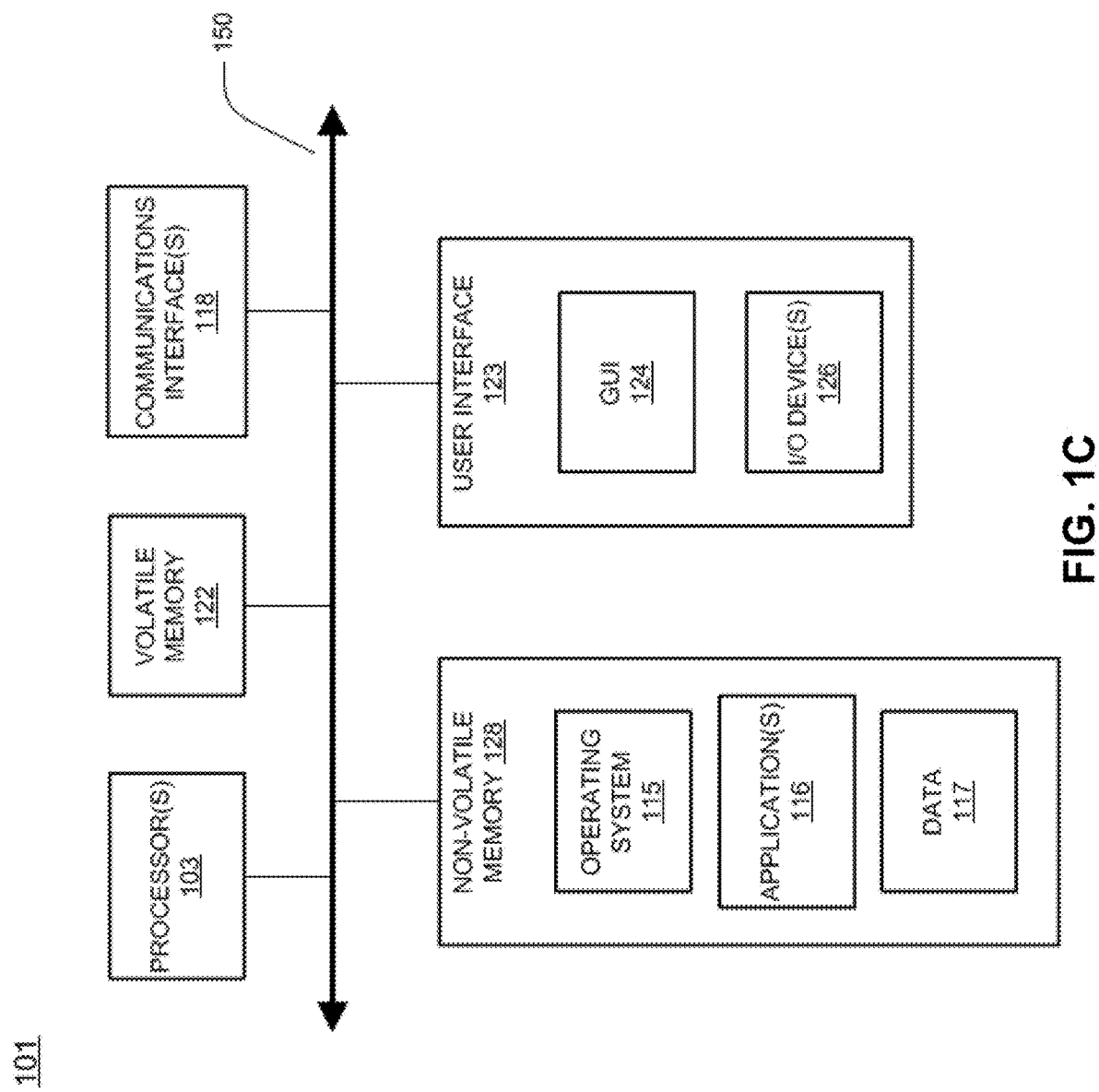
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
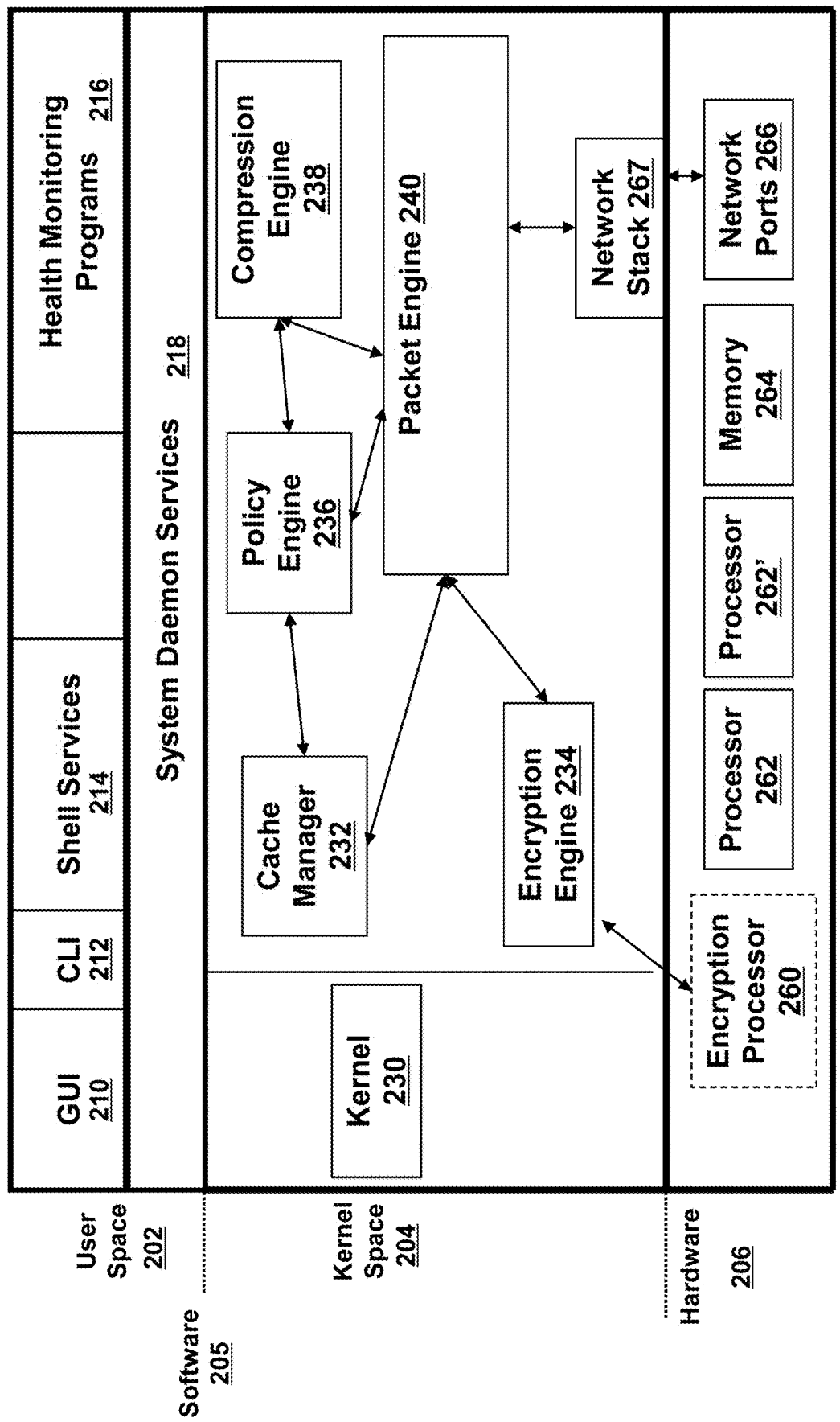
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
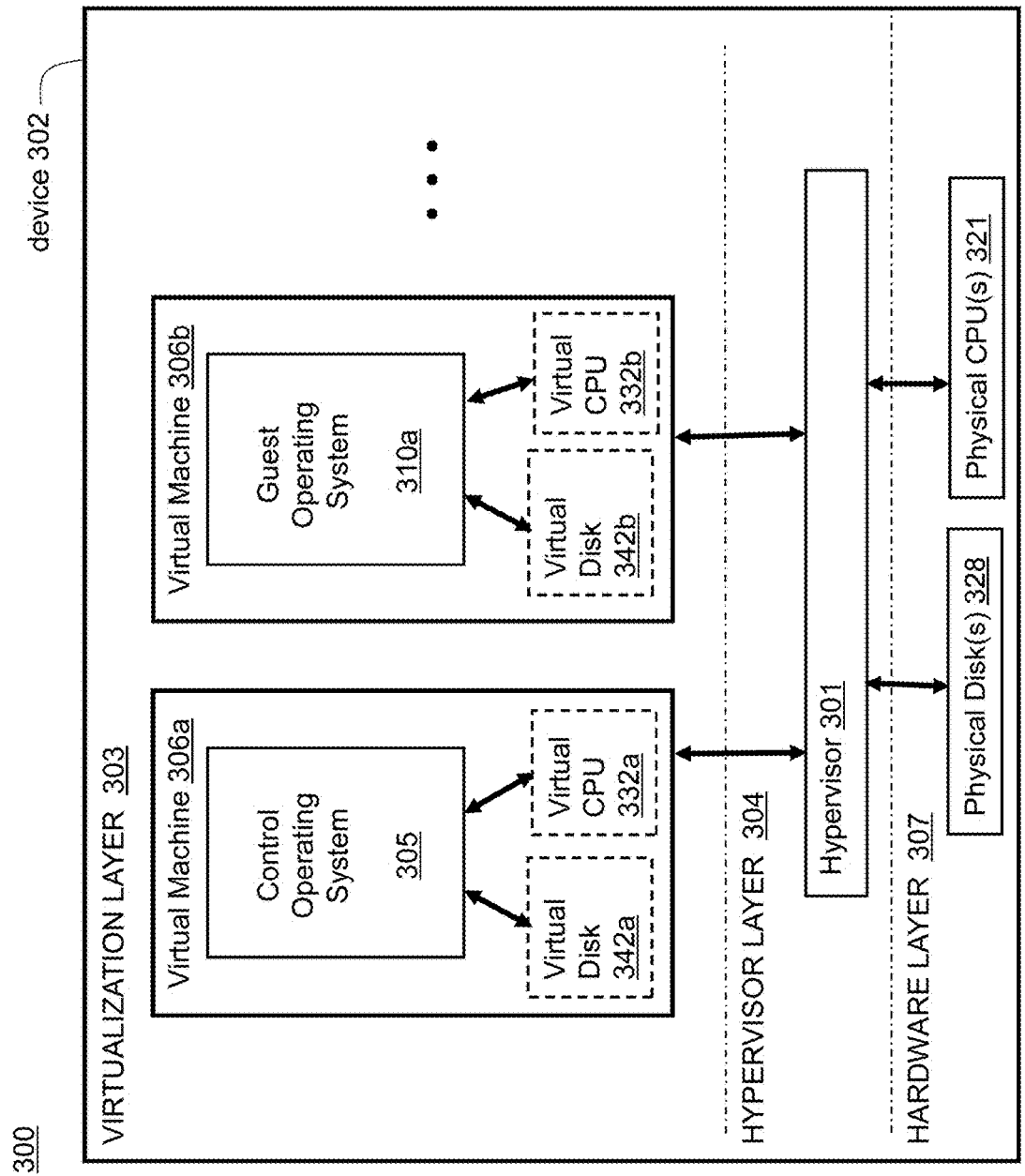
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
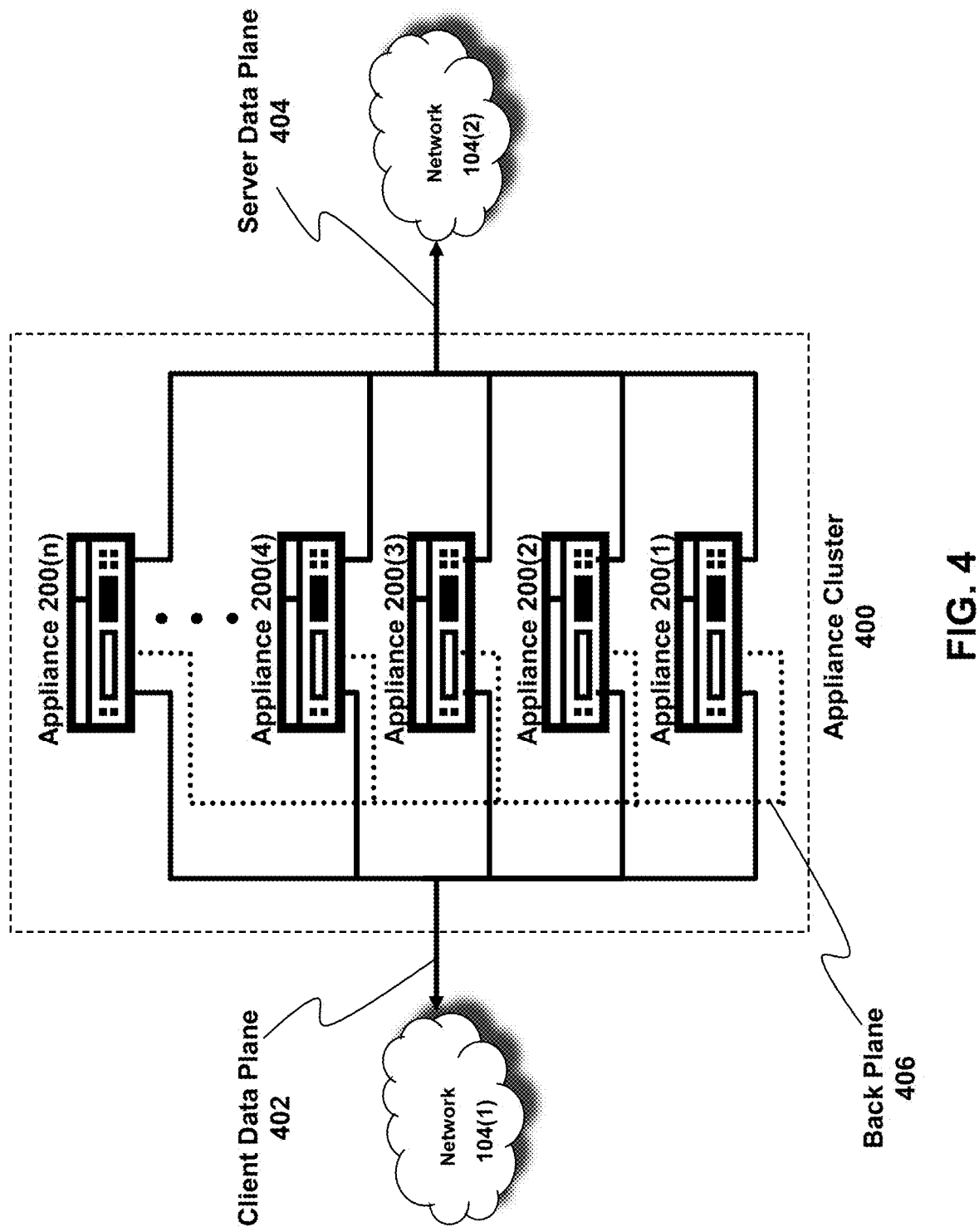
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
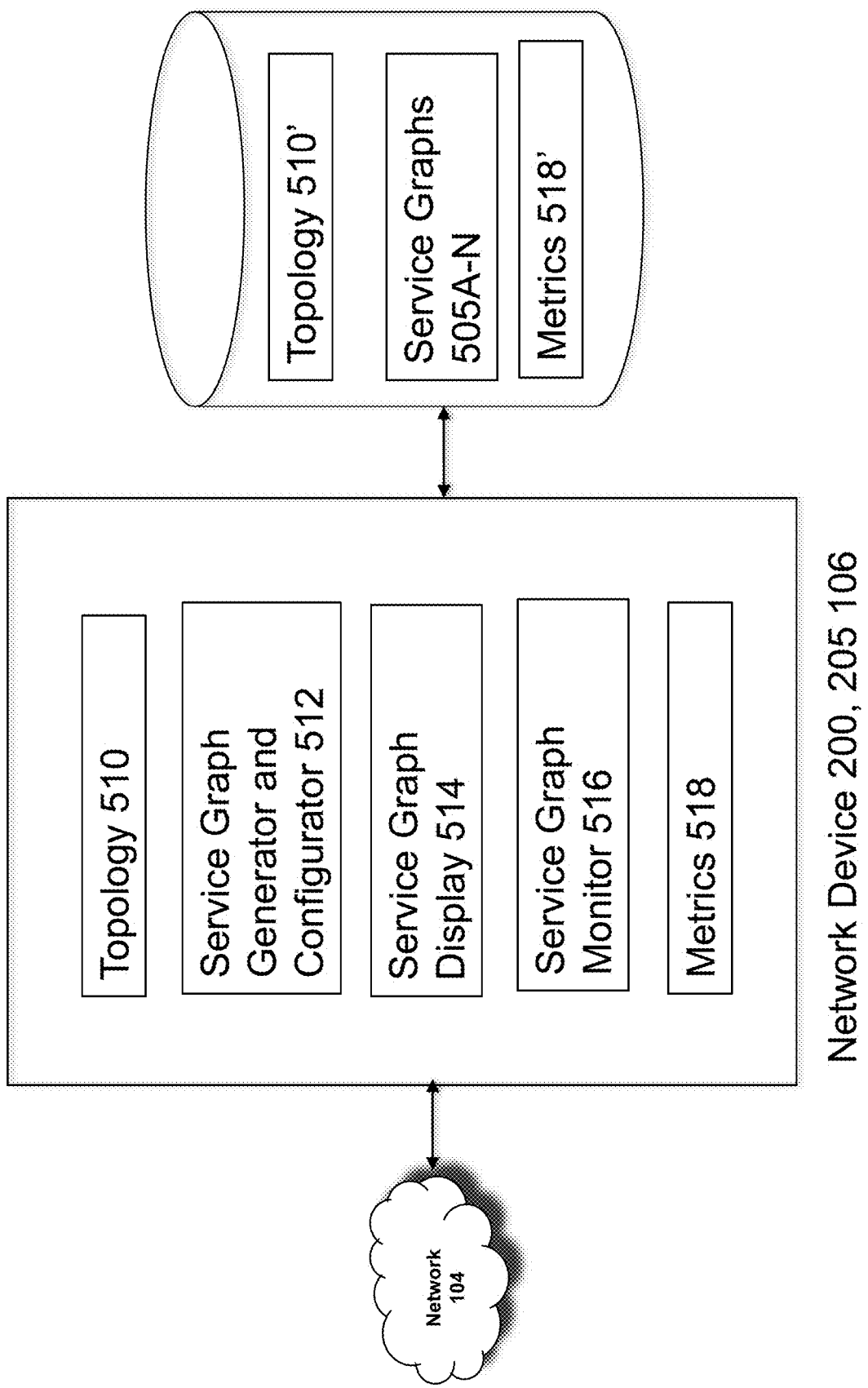
FIG. 5A is a block diagram of a service graph based system, in accordance with an illustrative embodiment.
Figure 5B:
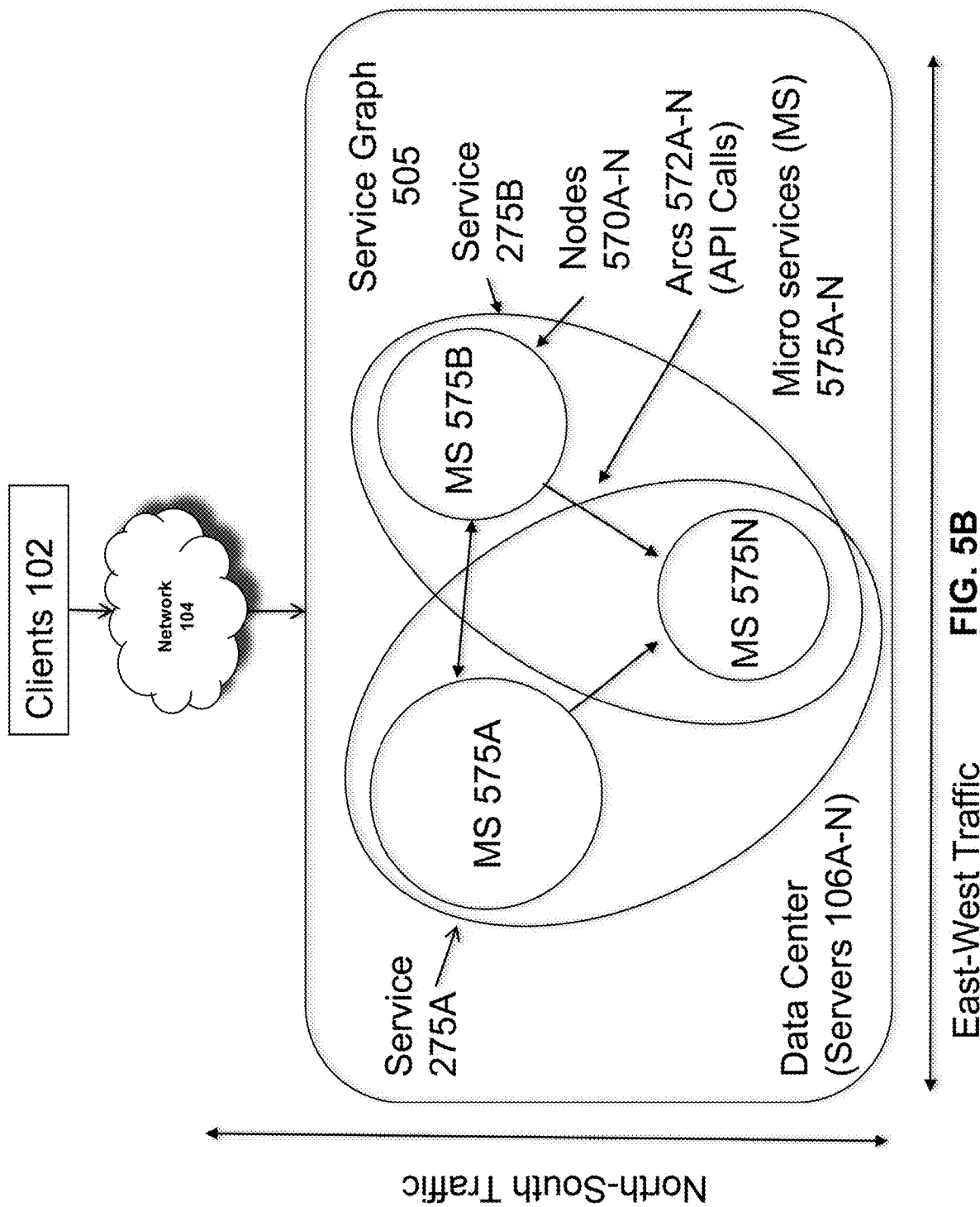
FIG. 5B is a block diagram of a service graph, in accordance with an illustrative embodiment.
Figure 5C:
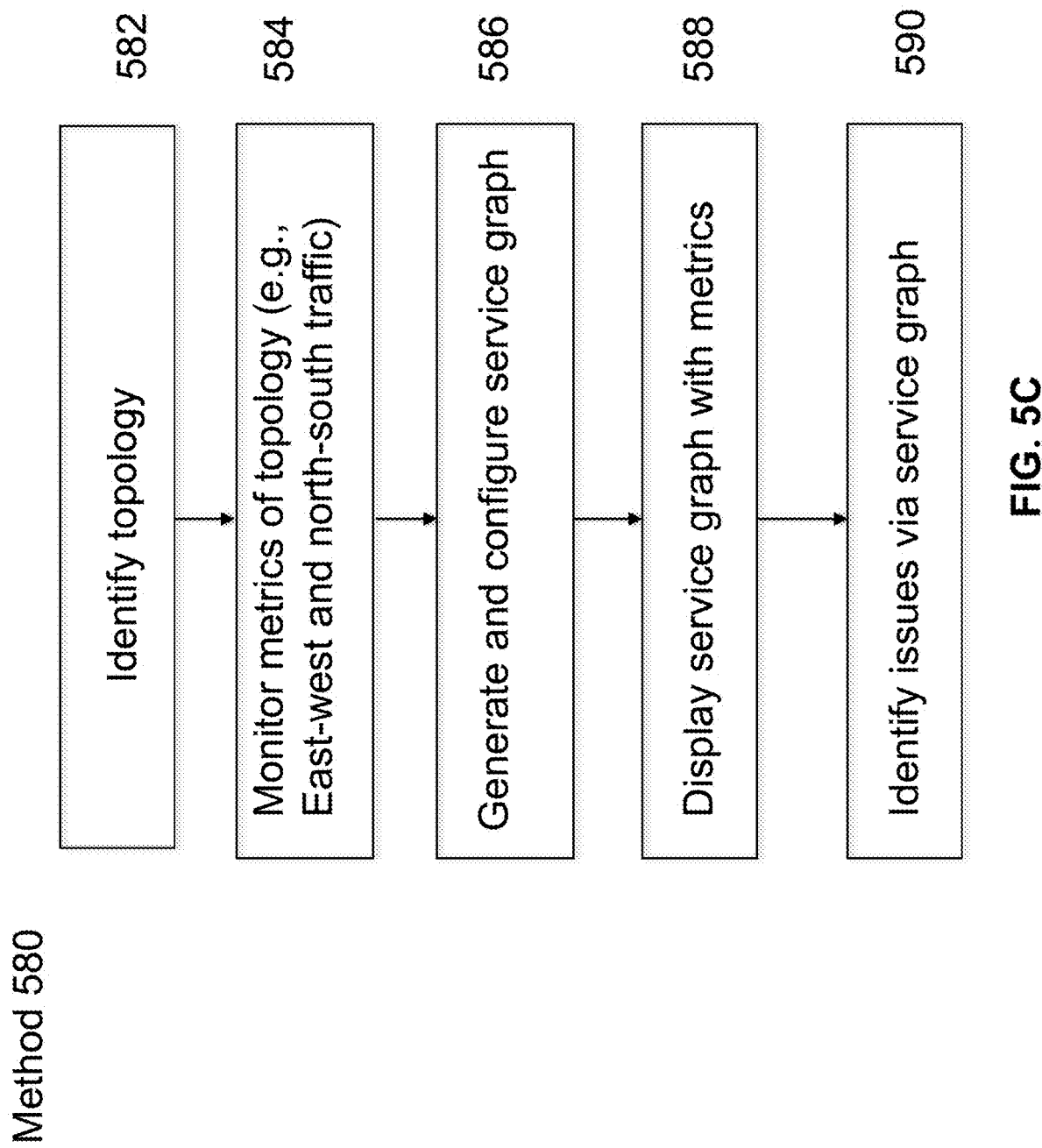
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-

N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with microservices of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. Using a Call Chain to Identify Dependencies Among a Plurality of Microservices The present disclosure is directed towards systems and methods for using a call chain to identify dependencies among a plurality of microservices. A device can be disposed intermediary to a plurality of microservices to monitor and track calls between the plurality of services. The device can track calls or requests generated responsive to an initial or first request to determine dependencies between the plurality of microservices. For example, responsive to receiving a first request to access a first microservice, the device can establish a call chain identifying a plurality of requests to a first microservice through a last microservice of the plurality of microservices accessed responsive to the initial or first request. The device can forward the first request including the call chain to the first microservice and each subsequent request including the call chain to each subsequent microservice. The device can identify, via the call chain, one or more dependencies between the plurality of microservices. Different services may provide graph tracing by attaching a debugger to processes using an application performance management tool or other form of tool to track or monitor calls between different services. However, the information can be generated only after all of the calls have been made or the information can be generated lacking transparency.

In embodiments described herein, a device can leverage a native networking framework or architecture to monitor and observe all traffic and calls communicated between a plurality of different services and microservices to generate the information transparently. In some embodiments, the device can generate the information in real-time or substantially in real-time, for example, as the calls are communicated. For example, the device can generate for each incoming request a unique ID. The device can generate a call chain ID for a call chain corresponding to the respective unique ID. In embodiments, if the call chain does not have or include a call chain ID, the call chain can begin with the unique ID of the initial or first unique ID generated for the initial or first request. In some embodiments, the device can append a current call chain ID to a list of original call requests. The unique IDs and the call chain IDs can be stored in such a way that subsequent calls or requests can include or receive the call chain. For example, the device can append the call chain to include the unique IDs of the respective requests associated with the call chain.

The device can log and store the call chains. In some embodiments, the call chains can be processed by a backend process performed the device or a component of the device. For example, the device can process the call chains to determine the deep call graphs of each endpoint, service and microservice to determine one or more dependencies between the plurality of microservices. The device can collect and store statistics, such as historical data, to identify newly discovered dependencies between the plurality of microservices. In some embodiments, the device can use the statistics for alerting as well as statistics regarding the calls themselves, such as call count, times, and success rates to provide data for correlation.

Figure 6:
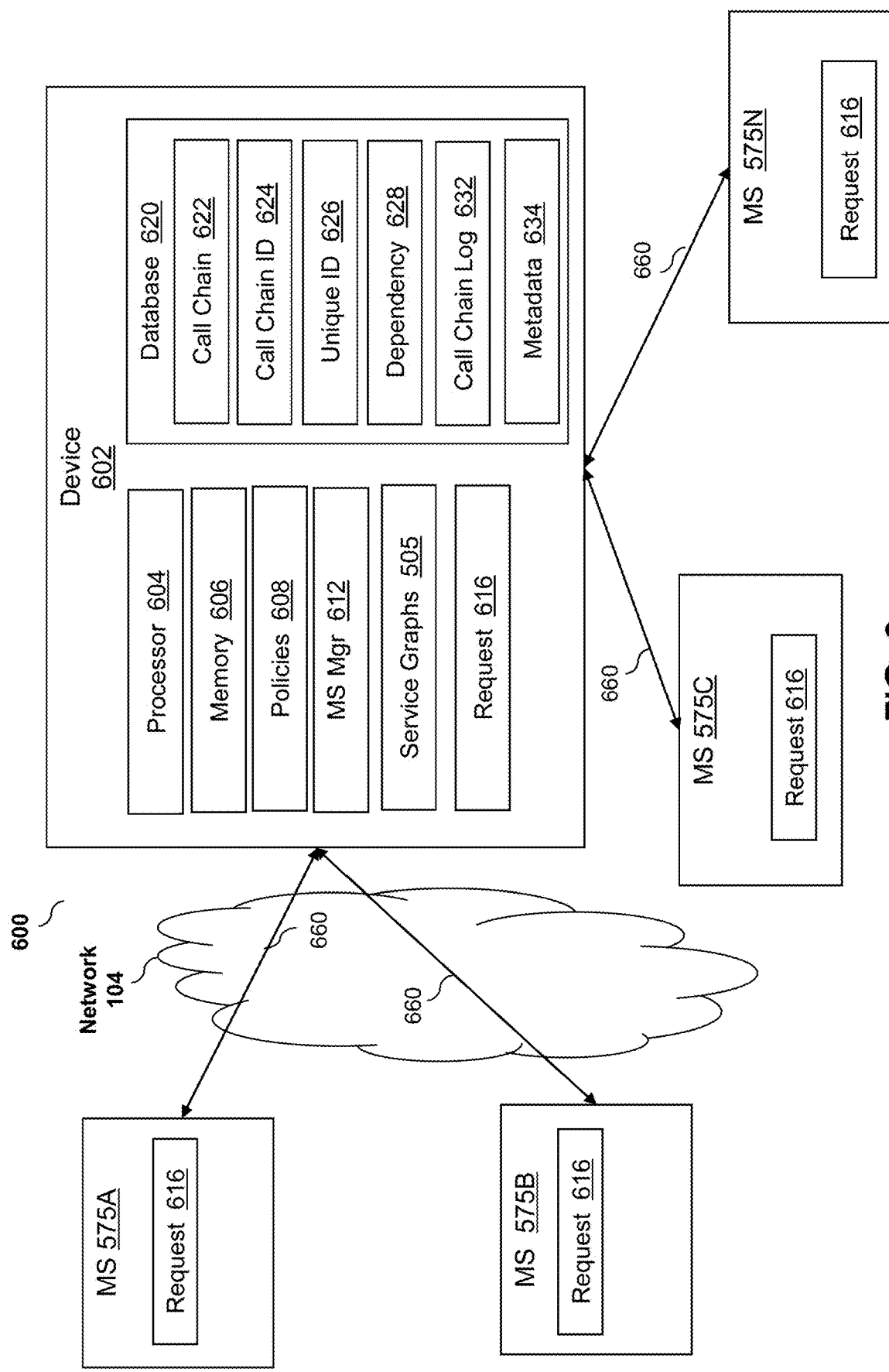
FIG. 6 is a block diagram of a system for using a call chain to identify dependencies among a plurality of microservices.

Referring now to FIG. 6, depicted is a block diagram of a system 600 for using a call chain 622 to identify dependencies 628 among a plurality of microservices 575. The device 602 can include an intermediary device, intermediary to a plurality of microservices 575 and/or a plurality of client devices (e.g., clients 102 of FIGS. 1A-1C and 5B). For example, the device 602 can include a proxy or a gateway to monitor calls and traffic, and route calls and traffic between a plurality of microservices 575. The device 602 can include a server. The device 602 can include one or more processors 604 coupled to a memory 606. The processor 604 can include or be coupled to a non-volatile memory 606 that stores computer instructions and an operating system. For example, the computer instructions can be executed by the processor 604 out of volatile memory 606 to perform all or part of the methods 580 and 700. The device 602 can include or execute policies 608 or rules to identify dependencies 628 between a plurality of microservices 575. In embodiments, the device 602 can monitor traffic, such as east-west traffic or north-south traffic, between a plurality of microservices 575 to determine dependencies 628 between the respective microservices 575. The policies 608 can include rules for generating or processing a request 616. The policies 608 can include rules for generating unique identifiers (IDs) 626 responsive to receiving or processing a request 616. The policies 608 can include rules for generating or establishing a call chain 622. The policies 608 can include rules for generating or processing a request 616. The policies 608 can include rules for generating a service graph 505 for a call chain 622. In some embodiments, the policies 608 can include instructions for balancing load, bandwidth data, usage data and/or traffic routing data within a network 104.

The device 602 can be implemented using hardware or a combination of software and hardware. For example, each component of the device 602 can include logical circuitry (e.g., a central processing unit or CPU) that responses to and processes instructions fetched from a memory unit (e.g., memory 606). Each component of the device 602 can include or use a microprocessor or a multi-core processor. A multi-core processor can include two or more processing units on a single computing component. Each component of the device 602 can be based on any of these processors, or any other processor capable of operating as described herein. Each processor can utilize instruction level parallelism, thread level parallelism, different levels of cache, etc. For example, the device 602 can include at least one logic device such as a computing device or server having at least one processor to communicate via a network 104. The components and elements of the device 602 can be separate components or a single component. For example, the device 602 can include combinations of hardware and software, such as one or more processors configured to initiate stop commands, initiate motion commands, and transmit or receive event data, for example. The device 602 can include a structured set of data. For example, the device 602 can include and/or store a plurality of metadata 634 corresponding to a call chain 622, one or more microservices 575, and/or one or more requests 616.

The device 602 can include a memory component (e.g., memory 606) to store and retrieve data. The memory 606 can include a random access memory (RAM) or other dynamic storage device, coupled with the device 602 for storing information, and instructions to be executed by the device 602. The memory 606 can include at least one read only memory (ROM) or other static storage device coupled with the device 602 for storing static information and instructions for the device 602. The memory 606 can include a storage device, such as a solid state device, magnetic disk or optical disk, coupled with the device 602 to persistently store information and instructions.

The device 602 can include a microservice manager 612 to manage a plurality of microservices 575. The microservice manager 612 can be implemented using hardware or a combination of software and hardware. For example, the microservice manager 612 can include logical circuitry (e.g., a central processing unit or CPU) that responses to and processes instructions fetched from a memory unit (e.g., memory 606). The microservice manager 612 can include or use a microprocessor or a multi-core processor. A multi-core processor can include two or more processing units on a single computing component. The microservice manager 612 can include or can be based on any of these processors, or any other processor capable of operating as described herein. Each processor can utilize instruction level parallelism, thread level parallelism, different levels of cache, etc. For example, the microservice manager 612 can include at least one logic device such as a computing device or server having at least one processor to communicate via a network 104. The components and elements of the microservice manager 612 can be separate components or a single component. For example, the microservice manager 612 can include combinations of hardware and software.

In embodiments, the microservice manager 612 can generate and/or maintain a service graph 505 for a call chain 622. For example, the microservice manager 612 can generate at least one service graph 505 for each call chain 622. The service graph 505 can be the same as or substantially similar to the service graphs 505 described above with respect to FIGS. 5A-5C. In embodiments, the microservice manager 612 and/or the device 602 can generate the service graph 505 to include data representing the topology of a service 275 or a plurality of microservices 575 for a call chain 622. The service graph 505 can illustrate or show the dependencies 628 of the plurality of microservices 575 associated with a call chain 622.

The device 602 can include a database 620. The database 620 can include a structured set of data (e.g., event data stored for the device 602). For example, the database 620 can include one or more call chains 622 or call chain data. A call chain 622 can include a plurality of requests 616 corresponding to a plurality of microservices 575. In embodiments, the call chain 622 can include a plurality of requests 616 corresponding to a first microservice 575 through a last microservice 575 accessed responsive to an initial or first request 616. The call chain 622 can include a call chain ID 624. In some embodiments, the device 602 can generate a call chain ID 624 for each call chain 622 to uniquely identify the respective call chain 622. The call chain 622 can include a plurality of unique IDs 626 (e.g., request IDs 626). For example, each of the requests 616 included with or associated with a call chain 622 can include at least one unique ID 626. Thus, the call chain 622 can include a plurality of unique IDs 626 corresponding to the plurality of requests 616 included with or associated with a call chain 622. The database 620 can include a call chain log 632. The call chain log 632 can include a listing of a plurality of call chains 622. The call chain log 632 can correspond to a listing of a plurality of relationships between a plurality of microservices 575.

The database 620 can include a plurality of dependencies 628. A dependency 628, can include, but not limited to, a relationship between at least two microservices 575. For example, a dependency 628 can correspond to an order in which one or more microservices 575 work together, are grouped together or collectively respond to one or more requests 616. The dependency 628 can include a reliance of at least one microservice 575 to use the functionality, skill or services of at least one other microservice 575 to handle or execute a request 616 or multiple requests 616.

The database 620 can include metadata 634. The metadata 634 can correspond to or include data or information associated with one or more microservices 575, one or more requests 616, one or more call chains 622 and/or one or more service graphs 505. The metadata 634 can correspond to or include call chain IDs 624 and/or unique IDs 626. In some embodiments, the metadata 634 can include statistics associated with one or more calls between a plurality of microservices 575, call counts, call times, success rates and/or failure rates. In embodiments, the device 602 can generate a call chain 622 to include metadata 634. For example, the device 602 can generate a call chain 622 to include metadata 634 attached or included with one or more requests 616 of the respective call chain 622. The metadata 634 attached or included with the one or more requests 616 of the respective call chain 622 can include, but not limited to, call chain IDs 624 and/or unique IDs 626.

A plurality of microservices 575 can couple with or otherwise interact with the device 602. In embodiments, the plurality of microservices 575 can be a component of one or more services 275. For example, the microservices 575 can be the same as or substantially similar to microservices 575A-575N described above with respect to FIGS. 5A-5C. For example, two or more microservices 575 can be grouped together or interact with each other to provide the functionality or skills of at least one service 275. The microservices 575 can communicate with one or more other microservices 575 via application programming interface (APIs). In some embodiments, the microservices 575 can couple with or receive requests 616 from the device 602 via one or more channels 660. The channels 660 can include a session or connection between the device 602 and at least one microservice 575. In some embodiments, the channels 660 can include a session or connection between two or more microservices 575. The channel 660 may include encrypted and/or secure sessions established between the device 602 and at least one microservice 575 or between two or more microservices 575. The encrypted session can include an encrypted connection between a device 602 and at least one microservice 575 or between two or more microservices 575.

Network 104 may be a public network, such as a wide area network (WAN) or the Internet. In some embodiments, network 104 may be a private network such as a local area network (LAN) or a company Intranet. Network 104 may be the same as or substantially similar to network 104 described above with respect to FIGS. 1A-1B, 4, and 5A-5B.

Each of the above-mentioned elements or entities is implemented in hardware, or a combination of hardware and software, in one or more embodiments. Each component of the device 602 may be implemented using hardware or a combination of hardware or software detailed above in connection with FIGS. 1-5B. For instance, each of these elements or entities can include any application, program, library, script, task, service, process or any type and form of executable instructions executing on hardware of a client device (e.g., device 602). The hardware includes circuitry such as one or more processors in one or more embodiments.

Figure 7A:
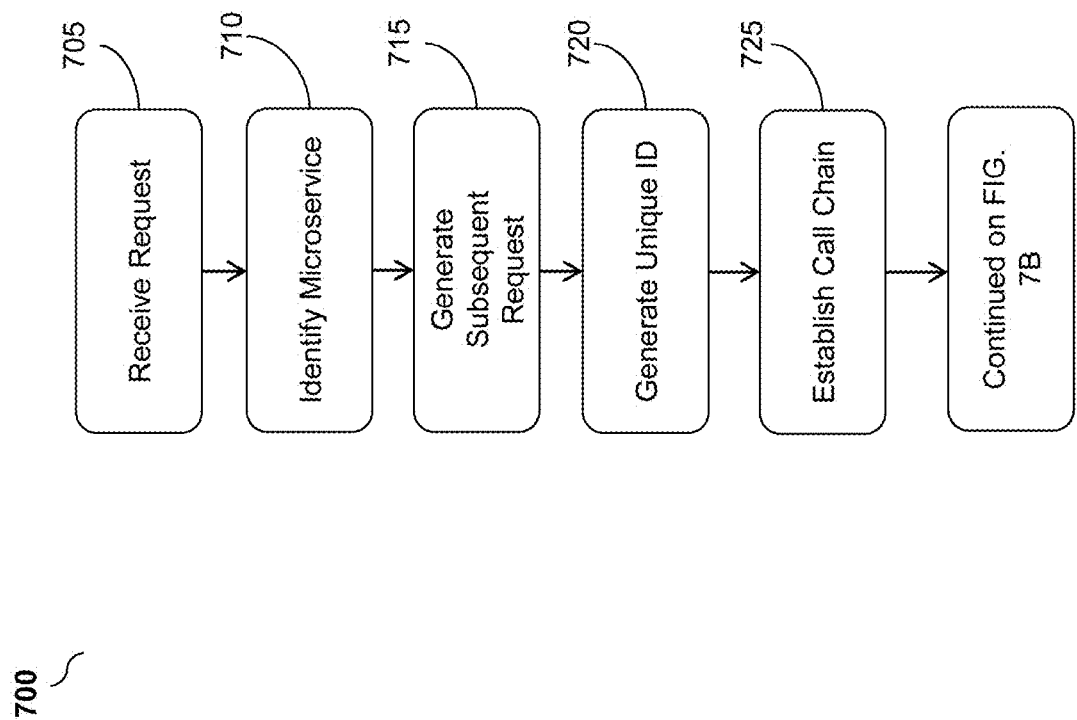
FIGS. 7A-7C are a flow diagram of a method for using a call chain to identify dependencies among a plurality of microservices.
Figure 7B:
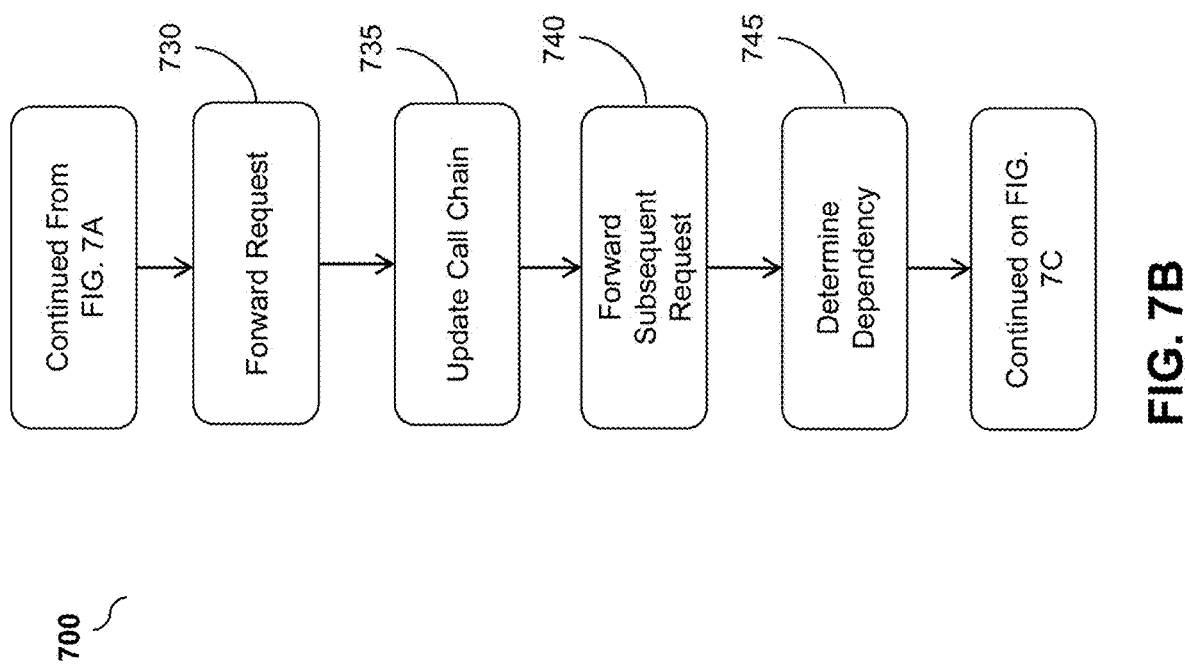
Figure 7C:
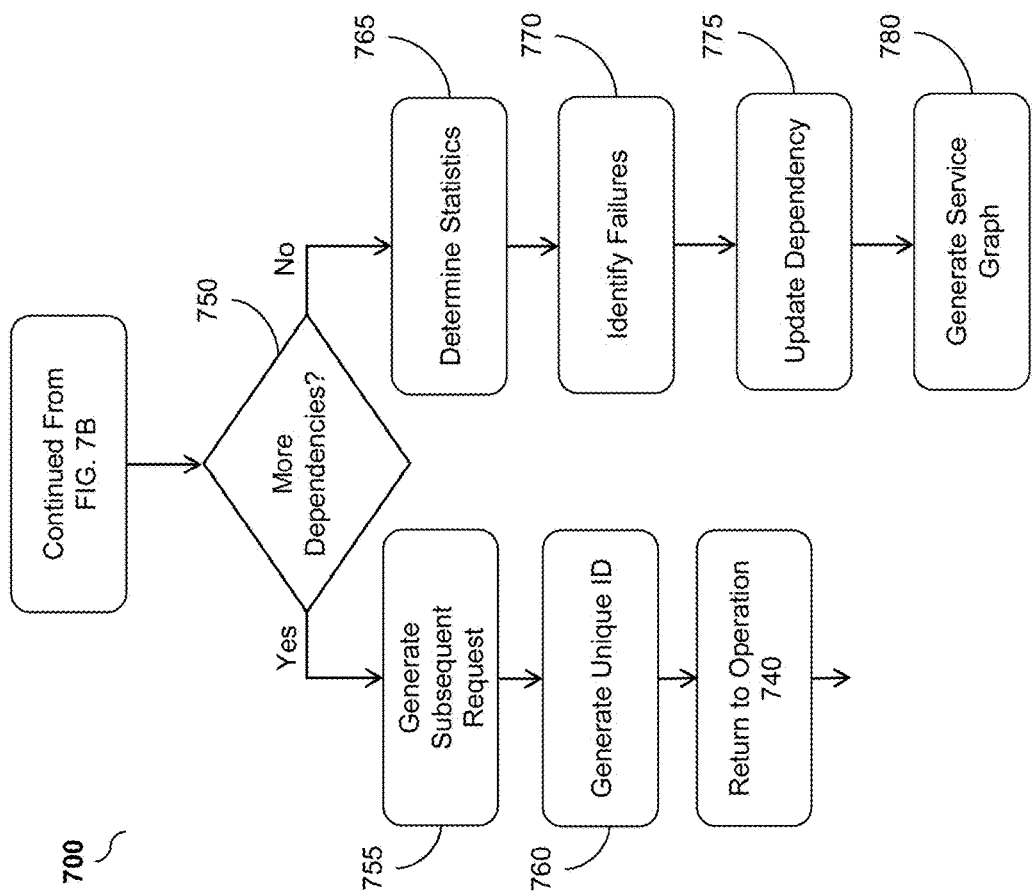

Referring now to FIGS. 7A-7C, depicted is a flow diagram of one embodiment of a method 700 for using a call chain to identify dependencies among a plurality of microservices. The functionalities of the method 700 may be implemented using, or performed by, the components detailed herein in connection with FIGS. 1-6.

Referring now to operation (705), and in some embodiments, a request 616 can be received. In embodiments, a device 602 intermediary to a plurality of microservices 575 can receive a first request 616 to access a first microservice 575 of the plurality of microservices 575. In some embodiments, during processing of the first request 616 by the first microservice 575 causes the first microservice 575 to communicate at least a second request 616 to a second microservice 575 of the plurality of microservices 575. The microservices 575 can be grouped or dependent one or more other microservices 575 to form a component of at least one service 275. For example, the microservices 575 can be grouped or dependent one or more other microservices 575 to perform a function or skill of at least one service 275.

The request 616 can be received from a client device (e.g., client 102 of FIGS. 1A-1B, 5B). In some embodiments, the request 616 can be received a server or microservice 575.

For example, the requests 616 can include a call from a first microservice 575 to a second, different microservice 575. The request 616 can include a request for at least one service, execution of at least one service, at least one application and/or execution of at least one application. The request 616 can identify at least one service, at least one microservice associated with at least one service, at least one application and/or at least one microservice associated with the application. For example, a service can include a collection or plurality of microservices 575. In embodiments, a service can include, be built and/or generated using one or more microservices 575 such that each of the one or more microservices 575 perform part of the function of the respective service. In some embodiments, an application can include a collection or plurality of microservices 575. In embodiments, an application can include, be built and/or generated using one or more microservices 575 such that each of the one or more microservices 575 perform part of the function of the respective application.

Referring now to operation (710), and in some embodiments, a microservice 575 can be identified. The device 602 device 602 can determine at least one microservice 575 associated with the request 616. For example, the device can determine at least one microservice 575 associated with a service identified in the request 616. The device 602 can determine a plurality of microservices 575 associated with the request 616 and/or service associated the request 616. In some embodiments, the device can determine at least one microservice 575 associated with an application identified in the request 616. The device 602 can determine a plurality of microservices 575 associated with the request 616 and/or an application associated the request 616.

In some embodiments, the device 602 can determine at least one microservice 575 to handle the request 616. For example, the device can select at least one microservice 575 of the plurality of microservices 575 to the handle the request 616. The microservice 575 can be selected based in part on the parameters included within the request 616. For example, the device 602 can select a microservice 575 based in part on a service identified in the request 616, a type of service identified in the request 616, an application identified in the request 616, a type of application identified in the request 616 and/or a function or service of a service or application identified in the request 616. In some embodiments, a header or metadata included with the request 616 can include or indicate a call chain 622 and/or one or more microservices 575 associated with a call chain 622. For example, the device 602 can receive the request 616 and determine a call chain corresponding to the request 616 using the header data and/or metadata. The device 602 can identify at least one microservice 575 for the request 616 or a first microservice 575 of a plurality of microservices 575 associated with the call chain 622.

Referring now to operation (715), and in some embodiments, a subsequent request 616 can be generated or received. The device 602, during processing of a request 616, can generate a subsequent request 616. For example, the device 602, during processing of an initial request 616, first request 616 or previous request 616, can generate a subsequent request 616 (e.g., subsequent to the initial, first or previous request) or second request 616. The subsequent request 616 or second request 616 can identify a second microservice 575. The second microservice 575 can be different from the first microservice 575 or the microservice 575 that received the request 616. The device 602 can determine that a second or additional microservice 575 is to handle or execute part of the request 616 with or in conjunction with the first microservice 575. The device 602 can generate a second or subsequent request 616 for the identified second microservice 575. The second or subsequent request 616 can identify a function or service the respective second microservice 575 is to perform to handle or execute part of the request 616.

In some embodiments, the first microservice 575 or the microservice 575 that received the request 616 can generate the subsequent request 616 or second request 616. For example, the microservice 575 can determine that one or more parts of the request 616 can be or are typically handled by one or more different microservices 575. The microservice 575 can generate a second or subsequent request 616 for at least one of the one or more different microservices 575 to handle a part of the request 616. In embodiments, the device 602 can receive a second request 616 or subsequent request 616 to access a second microservice 575 or subsequent microservice 575 responsive to the first microservice 575 processing the first request 616.

Referring now to operation (720), and in some embodiments, a unique identifier (ID) 626 can be generated. In embodiments, the device 602 can generate a first unique ID 626 for the first request 616 to the first microservice 575. The device 602 can generate at least one unique ID 626 for each request 616 received. For example, the device 602 can generate a second unique ID 626 or subsequent ID 626 responsive to receiving a second request 616 or subsequent request 616. In embodiments, the device 602 can generate a third unique ID 626 for a third request 616 responsive to receiving a third request 616 or subsequent request 616. The unique IDs 626 can correspond to an initial ID for a call chain 622. In some embodiments, the unique IDs 626 can be identified by a call chain 622. The unique ID 626 can indicate the respective request 616 the ID 626 was generated for. The unique ID 626 can indicate a call chain 622 the respective request 616 is included with. The unique ID 626 can indicate one or more microservices 575 associated with the request 616. In embodiments, the device 602 can generate the unique ID 626 for a request 616 responsive to receiving the respective request 616. In some embodiments, the unique IDs 626 can be referred to as request IDs 626. The device 602 can store the respective unique IDs 626 (e.g., request IDs 626) in a database 620 of the device 602 or remotely located from the device 602.

Referring now to operation (725), and in some embodiments, a call chain 622 can be established. In embodiments, the device can establish a call chain 622 for identifying a plurality of requests 616 to a first microservice 575 through a last microservice 575 of the plurality of microservices 575 accessed responsive to the first request 616. The call chain 622 can include or identify the first unique ID 626. The call chain 622 can include at least one unique ID 626 for each of the requests 616 include with or associated with the respective call chain 622. The device 602 can generate a call chain ID 624 for each call chain 622 to uniquely identify the respective call chain 622. The call chain 622 can include a plurality of unique IDs 626 (e.g., request IDs 626) corresponding to requests 616 associated with the call chain 622. In embodiments, the call chain 622 can include two or more requests 616 for a microservice 575 or a plurality of microservices 575. For example, the call chain 622 can include a listing of microservices 575, for example, from a first microservice 575 through a last microservice 575 used to handle or execute one or more requests 616. The call chain 622 can be generated responsive to an initial or first request 616. The call chain can 622 include the initial or first request 616 and the microservice 575 used to handle or execute the initial or first request 616, each request 616 generated responsive to the initial or first request 616 and each microservice 575 used to handle each request 616 generated responsive to the initial or first request 616.

The device 602 can generate the call chain 622 to include metadata 634. For example, the device 602 can generate the call chain 622 to metadata 634 attached to one or more requests 616 of the respective call chain 622. The call chain 622 can include metadata 634, such as but not limited to, call chain IDs 624, unique IDs 626, dependency data attached to one or more requests associated with the call chain 622. In some embodiments, the metadata 634 can be included with or added to a header of the respective requests 616. For example, a header of one or more requests 616 can include, but not limited to, the call chain 622, call chain IDs 624, unique IDs 626, and/or dependency data.

In some embodiments, the call chain 622 can include a listing or order of requested functions or services for an application or one or more microservices 575. The requests 616 can arranged or organized within the call chain 622 in a predetermined order. For example, the requests 616 can be arranged or organized within the call chain 622 based in part on a time value of when the respective request 616 was received. The requests 616 can be arranged or organized within the call chain 622 based in part on a function or service associated with the respective request 616. The requests 616 can be arranged or organized within the call chain 622 based in part on an order selected or determined by the device 602.

Referring now to operation (730), and in some embodiments, a request 616 can be forwarded. In embodiments, the device 602 can forward the first request 616 including the call chain 622 to the first microservice 575. The device 602 can identify and forward a request 616 to the respective microservice 575 associated with or identified by the request 616. For example, the device 602 can forward or transmit the initial or first request 616 to the first microservice 575 associated with the initial or first request 616 of a plurality of microservices 575.

Referring now to operation (735), and in some embodiments, a call chain 622 can be updated. The device 602 can dynamically update the call chain 622 to include new or additional requests 616 are generated and new or additional microservices 575 are called to handle the respective new or additional requests 616. The device 602 can dynamically update the call chain 622 to include new or additional unique IDs 626 generated for new or additional requests 616. For example, in embodiments, the device 602 can include in the call chain 622 a second unique ID 626 generated by the device 602 for the second request 616 to the second microservice 575. The device 602 can include in the call chain 622 a subsequent unique ID 626 generated by the device 602 for a subsequent request 616, subsequent to an initial, first or previous request 616. The subsequent request 616 can identify or be associated with a subsequent microservice 575 that is different from the first or previous microservice 575. In some embodiments, the device 602 can update metadata 634 attached with one or more requests 616. For example, the device 602 can update metadata 634 attached with one or more requests 616 to include call chain IDs 624 and/or dependency data. The device 602 can update a header of one or more requests 616. For example, the device 602 can update a header of one or more requests 616 to include call chain IDs 624, unique IDs 626 and/or dependency data.

Referring now to operation (740), and in some embodiments, a subsequent request 616 can be forwarded. In embodiments, the device 602 can forward the second request 616 including the call chain 622 to the second microservice 575. The call chain 622 can identify the first microservice 575 and the second microservice 575. For example, the device 602 can use the call chain 622 to determine a microservice 575 to forward a second or subsequent request 616. The device 602 can identify and forward each subsequent request 616 to the respective subsequent microservices 575 associated with or identified by the subsequent request 616 as the subsequent requests 616 are generated. The device 602 can forward the call chain 622 or call chain data such that a microservice 575 can determine a subsequent microservice to forward a second or subsequent request 616. For example, the first microservice 575 can forward the second request 616 including the call chain 622 to the second microservice 575. The first microservice 575 or previous microservice 575 can identify and forward a subsequent request 616 to a subsequent microservice 575 associated with or identified by the subsequent request 616 as the subsequent request 616 is generated.

Referring now to operation (745), and in some embodiments, a dependency 628 can be determined. In embodiments, the device 602, via the call chain 622, can identify that the first microservice 575 depends on the second microservice 575. The device 602 can determine a dependency 628 based in part on an order of the requests 616 and/or microservices 575 identified in a call chain 622. For example, the call chain 622 can identify an order in which one or more microservices 575 can work together, be grouped together or collectively respond to one or more requests 616. The dependency can include a reliance of at least one microservice 575 to use the functionality, skill or services of at least one other microservice 575 to handle or execute a request 616. In one embodiment, a group of microservices 575 collectively can correspond to or be associated with the functionality of at least one service or application. The different microservices 575 of the group of microservices 575 can be dependent on each (e.g., have a dependency) to handle or execute a request 616 to perform the full functionality, skill or services of at least one service or application. The device 602, using a call chain 622, can determine which microservices 575 a first microservice 575 is linked with or dependent on. The call chain 622 can include or identify multiple dependencies 628. The device 602 can determine the multiple dependencies 628 included with or identified by the call chain 622 and each of the microservices 575 associated with the multiple dependencies 628.

Referring now to operation (750), and in some embodiments, a determination can be made if the call chain 622 and/or request 616 includes more dependencies. In embodiments, the device 602 can determine if the call chain 622 associated with the respective initial request 616 or previous request 616 includes anymore dependencies 628. The device 602 can determine if the initial request 616 or previous one or more requests 616 can be handled or executed by the identified one or more microservices 575 or if the call chain 622 associated with the respective initial request 616 or previous request 616 includes anymore dependencies 628. For example, the device 602 can determine the number of dependencies of the call chain 622. The device 602 can compare the requests 616 that have been handled or communicated to at least one microservice 575 with a list of requests 616 included with the call chain 622 to determine if each of the requests 616 included with the call chain 622 have been communicated to at least one microservice 575 or handled by at least one microservice 575. The device can determine if any more requests 616 need to be generated or communicated with at least one microservice 575. The device 602 can compare the microservices 575 that have been used or communicated with to process at least a part of the initial or previous one or more requests 616 with a list of microservices 575 included with the call chain 622. The device 602 can determine if one or more microservices 575 includes at least one more dependency 628 to handle or execute a request 616.

Referring now to operation (755), and in some embodiments, a subsequent request 616 can be generated. In embodiments, if any more requests 616 need to be generated or communicated with at least one microservice 575, the device 602 can generate a third request 616 or subsequent request 616. In some embodiments, if one or more microservices 575 includes at least one more dependency 628 to handle or execute a request 616, the device 602 can generate a third request 616 or subsequent request 616. The device 602 can during processing of each previous request 616, generate a next or subsequent request 616. The next or subsequent request 616 can be generated based in part on the identified dependencies of the call chain 622. For example, the device 602 can determine, using the identified dependencies that the second microservice 575 or previous microservice 575 has a dependency on a third or subsequent microservice 575. The device 602 determine a third or subsequent microservice 575 to handle or execute part of a previous or initial request 616. The device 602 can generate a third or subsequent request 616 for the third or subsequent microservice 575. In some embodiments, processing of the second request 616 or subsequent request 616 can cause the second microservice 575 to communicate the third request 616 to a third microservice 575 of the plurality of microservices 575.

Referring now to operation (760), and in some embodiments, a unique ID 626 can be generated. The device 602 can generate at least one unique ID 626 for each subsequent request 616 generated and/or received. The unique ID 626 can indicate the respective request 616 the ID 626 was generated for. The unique ID 626 can indicate a call chain 622 the respective request 616 is included with. The unique ID 626 can indicate one or more microservices 575 associated with the request 616. In embodiments, the device 602 can generate the unique ID 626 for a request 616 responsive to generating or receiving the respective request 616. The method 700 can return to operation (740) to forward a subsequent or third request 616. For example, in some embodiments, processing of the second request 616 or subsequent request 616 can cause the second microservice 575 to communicate a third request 616 to a third microservice 575 of the plurality of microservices 575.

Referring now to operation (765), and in some embodiments, statistics can be determined for a call chain 622. In embodiments, if the device 602 determines that no more requests 616 need to be generated or communicated with at least one microservice 575, the device 602 determine statistics for the call chain 622. In some embodiments, if the device 602 determines that the identified or used microservices 575 do not include at least one more dependency 628, the device 602 can determine statistics for the call chain 622.

The statistics can include, but not limited to, historical data corresponding to the call chain 622, the requests 616 associated with the call chain 622 and the dependencies 628 associated with the call chain 622. The statistics can include, but not limited to, call count, call times, failure rates, and/or success rates. In embodiments, the device 602 can monitor the plurality of microservices 575 associated with a call chain 622 and/or a plurality of requests 616 to determine the statistics for the respective call chain 622 and/or the respective plurality of requests 616. The device 602 can continually monitor the plurality of microservices 575 during execution of one or more requests 616 associated with a call chain 622 to determine the statistics for the respective call chain 622. In embodiments, the device 602 can track and monitor a number of times a microservice 575 has been called, a time at which the microservice 575 has been called and a rate of success of using the plurality of microservices 575 of the call chain 622.

Referring now to operation (770), and in some embodiments, a failure can be identified. The device 602 can use the statistics to detect one or more failures are associated with a call chain 622 or to detect one or more failures that occurred during the execution of one or more requests 616 associated with a call chain 622. In some embodiments, a failure can correspond to a call to at least one microservice that the respective microservice did not respond to and/or did not execute the respective request 616 included with the call correctly. For example, the device 602 can monitor the interactions between the different microservices 575 to determine a failure of a first microservice 575 to call a second, different microservice 575. The device 602 can monitor the interactions between the different microservices 575 to determine a failure of a first microservice 575 to respond to or answer a call from a second, different microservice 575. The device 602 can detect one or more failures for one or more calls associated with a call chain 622. The device 602 can determine a failure rate for one or more microservices 575 of a plurality of microservices 575 of a call chain 622. In some embodiments, the device 602 can determine that no failures are associated with the call chain 622 or that no failures occurred during the execution of one or more requests 616 associated with a call chain 622.

Referring now to operation (775), and in some embodiments, a dependency 628 can be updated. The device 602 can use the statistics to detect one or more dependencies 628 between the plurality of microservices 575 associated with a call chain 622. The device 602 can determine if a list of dependencies 628 for the call chain 622 needs to be updated. For example, the device 602 can compare a list of detected dependencies 628 detected during execution of one or more requests 616 associated with a call chain 622 to a list of dependencies 628 stored in a database 620 for the respective call chain 622 or the respective plurality of microservices 575 associated with the call chain 622. The device 602 can determine if the microservices 575 used any new dependencies 628. For example, the device 602 can determine which microservice 575 or microservices 575 that a first microservice 575 or subsequent microservice 575 called during the execution of execution of one or more requests 616 associated with the call chain 622. The device 602 can determine if the first microservice 575 or subsequent microservice 575 called the same microservice 575 or microservices 575 during the execution of execution of one or more requests 616 associated with the call chain 622. The device 602 can determine if the first microservice 575 or subsequent microservice 575 called one or more different microservices 575 during the execution of execution of one or more requests 616 associated with the call chain 622. The device 602 can determine if an identified dependency 628 for a microservice 575 needs to be updated. For example, the device 602 can determine if at least one dependency needs to be added to an identified dependency 628 or list of dependencies 628 for a microservice 575. The device 602 can determine if at least one dependency needs to be removed from an identified dependency 628 or list of dependencies 628 for a microservice 575. The device 602 can update the dependencies 628 for one or more microservices 575.

Referring now to operation (780), and in some embodiments, a service graph 505 can be generated. The device 602 can generate a service graph 505. The service graph 505 can be the same as or substantially similar to the service graphs 505 described above with respect to FIGS. 5A-5C. For example, the device 602 can generate the service graph 505 to include data representing the topology of a service 275 or a plurality of microservices 575 for a call chain 622. The device 602 can generate the service graph 505 based in part on the determined statistics for the call chain 622. The device 602 can generate the service graph 505 to show the dependencies 628 of the plurality of microservices 575 associated with the call chain 622. In embodiments, the device 602 can update dynamically or in real-time the elements and metrics of or represented by a service graph for a call chain 622.

In some embodiments, the device 602 can generate the service graph 505 to illustrate or identify a failure between a first microservice 575 and a second microservice 575 of a plurality of microservices 575 associated with the call chain 622. For example, the device 602 can generate the service graph 505 of the call chain 505 to identify a failure between the plurality of microservices 575, a number of times a microservice 575 has been called, a time at which the microservice 575 has been called and a rate of success of using the plurality of microservices 575 of the call chain 622.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method for using a call chain to identify dependencies among a plurality of microservices, the method comprising:
    (a) receiving, by a device intermediary to a plurality of microservices, a first request to access a first microservice of the plurality of microservices, wherein processing of the first request by the first microservice causes the first microservice to communicate at least a second request to a second microservice of the plurality of microservices;
    (b) generating, by the device, a first unique identifier for the first request to track processing of the first recent, the first request to the first microservice;
    (c) establishing, by the device, a call chain for identifying a plurality of requests to a first microservice through a last microservice of the plurality of microservices accessed responsive to the first request, wherein the call chain identifies the first unique identifier;
    (d) forwarding, by the device, the first request including the call chain to the first microservice;
    (e) including, by the device, in the call chain a second unique identifier generated by the device for the second request to track processing of the second request;
    (f) forwarding, by the device, the second request including the call chain to the second microservice, the call chain identifying the first microservice and the second microservice;
    (g) identifying, by the device via the call chain, that the first microservice depends on the second microservice;
    (h) comparing, by a generator of the device, one or more dependencies detected curing execution of requests associated with the call chain with a dependency list stores in a database;
    (i) generating, by a monitor of the device, statistics of the call chain; and
    (j) generating, by the generator of the device responsive to the comparison and the generated statistics, a service graph representing detected dependencies of the call chain.

2. The method of claim 1, wherein processing of the second request causes the second microservice to communicate a third request to a third microservice of the plurality of microservices.

3. The method of claim 2, further comprising generating, by the device, a third unique identifier for the third request and having the third unique identifier be identified by the call chain.

4. The method of claim 1, wherein (e) further comprising receiving, by the device, the second request to access the second microservice responsive to the first microservice processing the first request.

5. The method of claim 1, wherein (f) further comprises generating, by the device, the second unique identifier responsive to receiving the second request.

6. The method of claim 1, wherein a header of one of the first request or the second request comprises the call chain.

7. The method of claim 1, wherein the call chain comprises metadata attached to one of the first request or the second request.

8. The method of claim 1, wherein each of the plurality of microservices is a component of one or more services.

9. The method of claim 1, wherein the device is one a proxy or a gateway.

10. The method of claim 1, further comprising generating the service graph of the call chain to identify a failure between the plurality of microservices, a number of times a microservice has been called, a time at which the microservice has been called and a rate of success of using the plurality of microservices of the call chain.

11. A system for using a call chain to identify dependencies among a plurality of microservices, the system comprising:
    a device comprising one or more processors, coupled to memory and intermediary to a plurality of microservices, the device configured to receive a first request to access a first microservice of the plurality of microservices, wherein processing of the first request by the first microservice causes the first microservice to communicate at least a second request to access a second microservice of the plurality of microservices;
    wherein the device is configured to:
        generate a first unique identifier for the first request to track processing of the first request, the first request to the first microservice;
        establish a call chain for identifying a plurality of requests to a first microservice through a last microservice of the plurality of microservices accessed responsive to the first request, wherein the call chain identifies the first unique identifier;

wherein the device is configured to:
forward the first request including the call chain to the first microservice;
include in the call chain a second unique identifier generated by the device for the second request to track processing of the second request;
forward the second request including the call chain to the second microservice, wherein the call chain identifies the first microservice and the second microservice;
identify, via the call chain, that the first microservice depends on the second microservice;
compare, by a generator of the device, one or more dependencies detected during execution of requests associated with the call chain with a dependency list stored in a database;
generate, by a monitor of the device, statistics of the call chain; and
generate, by the generator of the device responsive to the comparison and the statistics, a service graph representing detected dependencies of the call chain.

12. The system of claim 11, wherein processing of the second request causes the second microservice to communicate a third request to a third microservice of the plurality of microservices.

13. The system of claim 12, wherein the device is further configured to generate a third unique identifier for the third request and having the third unique identifier be identified by the call chain.

14. The system of claim 11, wherein the device is further configured to receive the second request to access the second microservice responsive to the first microservice processing the first request.

15. The system of claim 11, wherein the device is further configured to generate the second unique identifier responsive to receiving the second request.

16. The system of claim 11, wherein a header of one of the first request or the second request comprises the call chain.

17. The system of claim 11, wherein the call chain comprises metadata attached to one of the first request or the second request.

18. The system of claim 11, wherein each of the plurality of microservices is a component of one or more services.

19. The system of claim 11, wherein the device is further configured to generate the service graph to identify a failure between the plurality of microservices, a number of times a microservice has been called, a time at which the microservice has been called and a rate of success of using the plurality of microservices of the call chain.

20. A system comprising:
a device comprising one or more processors, coupled to memory and intermediary to a plurality of microservices, the device configured to:
track a plurality of requests between the plurality of microservices using a plurality of call chains, each of the plurality of call chains identifying via one or more unique identifiers a plurality of requests from a first microservice through a last microservice of the plurality of microservices, the one or more unique identifiers
generated for the plurality of requests to track processing of the plurality of requests;
generate, based at least on the plurality of call chains, one or more service graphs identifying one or more dependencies between two or more microservices;
identify via the one or more service graphs a failure between the two or microservices that have a dependency;
compare, by a generator of the device, the one or more dependencies detected during execution of the plurality of requests associated with the plurality of call chains with one or more dependency lists stored in a database;
generate, by a monitor of the device, statistics of the call chain; and
update, by the generator of the device responsive to the comparison and the statistics, the one or more service graphs representing detected dependencies of the plurality of call chains.

* * * * *